United States Patent Office 3,375,708
Patented Apr. 2, 1968

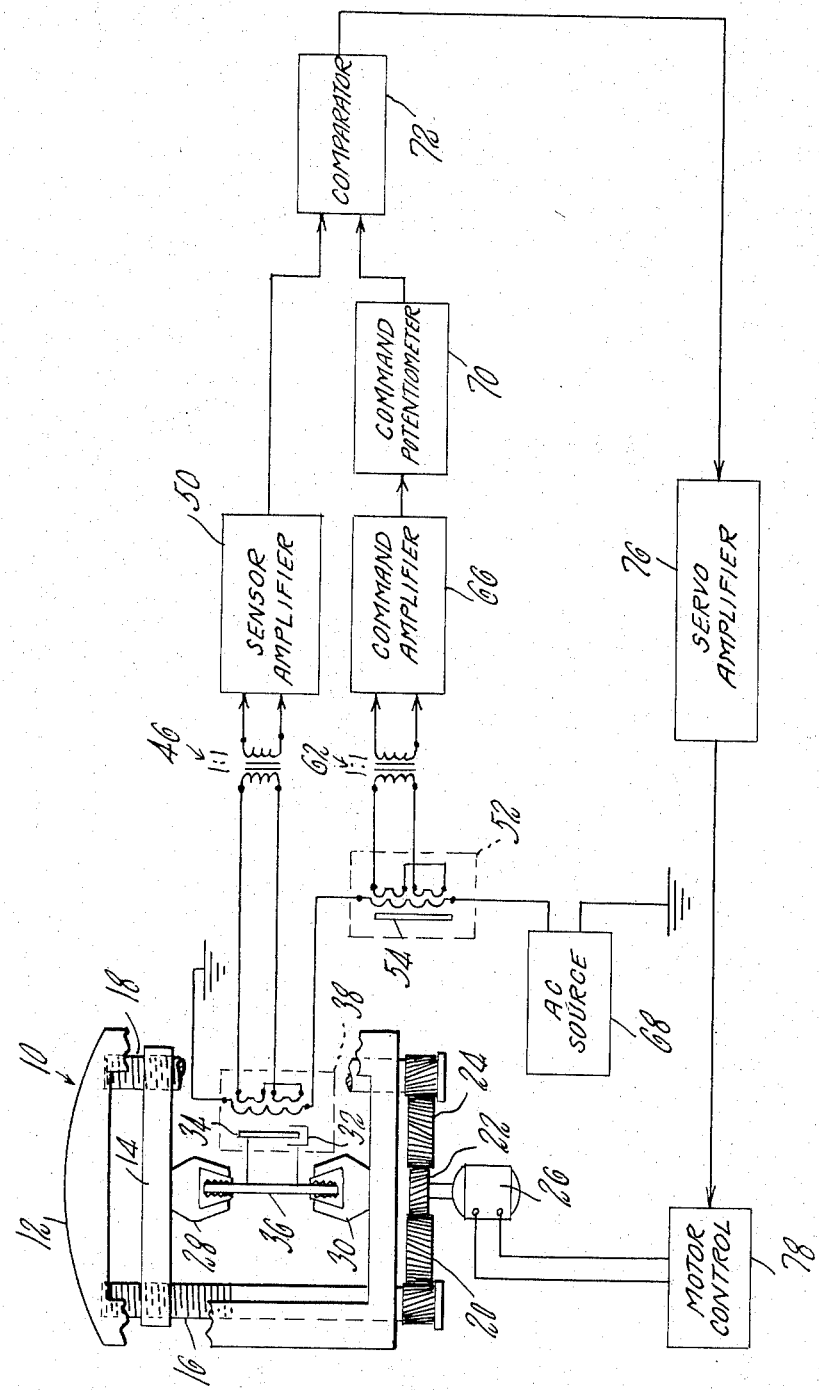

3,375,708
MATERIALS TESTING CONTROL CIRCUITRY
John Linnartz Preston, Needham, Mass., assignor to Instron Corporation, Canton, Mass., a corporation of Massachusetts
Filed Oct. 5, 1965, Ser. No. 493,193
1 Claim. (Cl. 73—90)

ABSTRACT OF THE DISCLOSURE

Materials testing device in which signals from LVDT and potentiometer are compared, one signal being representative of a condition at the specimen, and a dummy LVDT, matching the operative LVDT in electrical characteristics, excites the potentiometer.

This invention relates to materials testing and to control circuits particularly useful therein.

It is a primary object of the invention to provide sensor, command, and comparator circuitry in which wave characteristics in the sensor and command circuits are very much the same at a comparator, even though the sensor and the command would tend to impose on a common source of electrical current (whether or not varying in its own characteristics) different wave characteristics. A further object is to make possible improved control of e.g., strain magnitude.

The invention features inclusion in the sensor or command circuit of such a reference element identical with the command or sensor element in the other as is needed to produce a matching of wave effects. In a preferred embodiment of the invention featured, the sensor is a linear variable differential transformer (LVDT) and the command is a potentiometer, and their respective circuits are compared to give accurate control of strain magnitude in a test specimen, wave form in the command circuit being matched to that in the sensor circuit by including in the command circuit a reference LVDT identical with the sensor LVDT, the primaries of the two being in series.

Other objects, features, and advantages will appear from the following description of a preferred embodiment of the invention, taken with the attached drawing thereof in which:

FIG. 1 is a diagrammatic view of the materials testing machine and the control circuitry.

There is shown in the drawing a portion of a materials testing machine 10, composed of a frame 12, movable crosshead 14, drive screws 16 and 18, drive gears 20, 22, and 24, motor 26 and specimen grips 28 and 30.

Extensometer 32 is mounted on specimen 36, and is also mechanically coupled to a sensor circuit through LVDT 38 so that any change in length of specimen 36 will correspondingly affect the position of the core 34 in sensor LVDT 38. LVDT 38 thus serves to transduce the mechanical strain in the specimen to an electrical signal which is carried by the remainder of the sensor circuit, including isolation transformer 46, and amplifier 50, to a comparator 72.

A command circuit including LVDT 52 (the core of which is offset from electrical zero) identical to LVDT 38, isolation transformer 62, amplifier 66 and potentiometer 70 (calibrated in units of strain) is arranged to present a command signal to comparator 72, the amplitude of the command signal being controlled by the setting on potentiometer 70. The primaries of the two LVDT's are connected in series to alternating current source 68. By virtue of the common energization and identical characteristics of the LVDT's, the command and sensor signals have substantially identical phase and shape, enabling accurate comparison of the two signals by the comparator, which in turn is arranged to control the movement of crosshead 14 through servo-amplifier 76 and motor control 78.

In operation a value corresponding to the desired strain magnitude is set on potentiometer 70, thus determining the command signal amplitude. The sensor signal and command signal are compared by comparator 72 and any difference between the two causes motor control 78 to appropriately adjust the movement of the crosshead until the specimen strain magnitude (which may tend to vary at constant load owing, for example, to creep or to temperature change) is such as to make the sensor signal equal in amplitude to the command signal.

Other embodiments will occur to those skilled in the art and are within the following claim.

What is claimed is:

1. In a materials testing machine control device which comprises first and second circuits for producing a pair of signals, said signal of said first circuit being representative of specimen strain, and a comparator responsive to said circuits for delivering a signal representative of the difference in amplitudes of said signals, said first circuit including an LVDT responsive to specimen strain for determining the amplitude of its respective signal in accordance with said strain, said second circuit including a potentiometer for determining the amplitude of the signal from a dummy LVDT contained in said second circuit, that improvement comprising source means for said potentiometer including said dummy LVDT matching said first mentioned LVDT in electrical characteristics and connected in said second circuit to excite said potentiometer, the core of said dummy LVDT being stationary at a position offset from electrical zero, the primary windings of said LVDT's being connected in series, whereby the output of said comparator can be used to adjust said device to tend to equalize said signals of said first and second circuits.

References Cited

UNITED STATES PATENTS

| | | | |
|---|---|---|---|
| 2,411,451 | 11/1946 | De Martini et al. | 73—90 |
| 2,445,683 | 7/1948 | MacGeorge | 73—90 |
| 2,889,706 | 6/1959 | Huyser | 73—89 |

RICHARD C. QUEISSER, Primary Examiner.

JAMES H. WILLIAMSON, Assistant Examiner.